(12) United States Patent
Kezeu

(10) Patent No.: US 9,466,038 B2
(45) Date of Patent: Oct. 11, 2016

(54) WORKSITE MONITORING AND MANAGEMENT SYSTEMS AND PLATFORMS

(71) Applicant: Safety Key Solutions FZ-LLC, Dubai (AE)

(72) Inventor: Severin Kezeu, Dubai (AE)

(73) Assignee: SAFETY KEY SOLUTIONS FZ-LLC, Dubai (AE)

(*) Notice: Subject to any disclaimer, the term of this patent is extended or adjusted under 35 U.S.C. 154(b) by 0 days.

(21) Appl. No.: 14/628,036

(22) Filed: Feb. 20, 2015

(65) Prior Publication Data

US 2015/0242769 A1 Aug. 27, 2015

Related U.S. Application Data

(60) Provisional application No. 61/943,115, filed on Feb. 21, 2014.

(51) Int. Cl.
| | |
|---|---|
| *G06Q 10/00* | (2012.01) |
| *G06Q 10/06* | (2012.01) |
| *G08G 1/16* | (2006.01) |
| *G08G 1/00* | (2006.01) |

(52) U.S. Cl.
CPC ...... *G06Q 10/063* (2013.01); *G06Q 10/06314* (2013.01); *G08G 1/16* (2013.01); *G08G 1/20* (2013.01)

(58) Field of Classification Search
CPC .................. G06Q 10/063; G06Q 10/063114; G08G 1/16; G08G 1/20
USPC .................... 705/7.11, 32; 701/301; 702/188
See application file for complete search history.

(56) References Cited

U.S. PATENT DOCUMENTS

| | | | |
|---|---|---|---|
| 6,446,076 B1 | 9/2002 | Burkey et al. | |
| 7,538,664 B2 | 5/2009 | Dorgelo et al. | |
| 8,594,997 B2 | 11/2013 | Soltani et al. | |
| 8,892,513 B2 | 11/2014 | Forsythe | |
| 2003/0033123 A1* | 2/2003 | Jacobs | G06Q 10/06 703/2 |
| 2007/0027732 A1* | 2/2007 | Hudgens | G06Q 10/06 705/7.15 |
| 2007/0073555 A1* | 3/2007 | Buist | G06F 19/322 705/2 |
| 2007/0247789 A1* | 10/2007 | Benson | G01D 4/006 361/672 |
| 2008/0177646 A1* | 7/2008 | Frink | G06Q 10/1091 705/32 |
| 2009/0204916 A1* | 8/2009 | Benedek | G06F 1/3203 715/764 |
| 2012/0075123 A1 | 3/2012 | Keinrath et al. | |
| 2012/0317058 A1 | 12/2012 | Abhulimen | |
| 2013/0335221 A1* | 12/2013 | Prieto | G06Q 10/10 340/540 |
| 2014/0108234 A1 | 4/2014 | Mayerle et al. | |

OTHER PUBLICATIONS

David Cullen. A crystal ball for maintenance. Fleet Owner. Overland Park: Oct. 2005. vol. 100, Iss. 10; p. 168, 4 pgs.*
Zhu, Haiyan; Wu, Pingbo; Zeng, Jing; Teng, Wanxiu. Environment Monitoring System Research Based on the ZigBee Wireless Sensor Network Technology. Sensors & Transducers 170.5 (May 2014): 94-100.*
SK Solution webpage. Published Dec. 29, 2012. Retrieved from https://web.archive.org/web/20121229032330/http://www.sk-navigator.com/.*
SK Solutions—Navigator Safety Suite webpages. Published Dec. 29, 2012. Retrieved from https://web.archive.org/web/20121229032330/http://www.sk-navigator.com/. 5 pgs.*
SK Solutions. SK Co-Innovating with SAP. http://web.archive.org/web/20121229032330/http://www.sk-navigator.com/(2011).
PCT/IB2015/000953 International Search Report and Written Opinion dated Oct. 6, 2015.

* cited by examiner

*Primary Examiner* — Timothy Padot
(74) *Attorney, Agent, or Firm* — Wilson, Sonsini, Goodrich & Rosati

(57) ABSTRACT

A platform comprising sensing devices, servers and mobile devices for monitoring conditions of objects on worksites. Potential violations of operation rules are alarmed to avoid damage, collision, and disaster. Emergency is detected and responded to operating staff members in charge.

20 Claims, 12 Drawing Sheets

WORKSITE MONITORING AND MANAGEMENT SYSTEMS AND PLATFORMS

CROSS-REFERENCE TO RELATED APPLICATIONS

This application claims the benefit of U.S. application Ser. No. 61/943,115, filed Feb. 21, 2014, which is hereby incorporated by reference in its entirety.

BACKGROUND OF THE INVENTION

Safety, security, health, maintenance, and supply chain on worksites, e.g., constructions, airports, shipyards, factories, and mines, are important issues to achieve service-level-agreements (SLA) and quality and to control costs. Existing systems of monitoring worksites merely focus on a single aspect of safety, security or health, rather than integrating all pieces of information on a single platform. Furthermore, the lack of the integration cannot predict the potential damages and collisions, leading to disasters taking place. Therefore, a new system is necessary to avoid the damages, and it in turn hopefully can enhance the quality of working environment.

SUMMARY OF THE INVENTION

Described herein, in some embodiments, are platforms and systems for monitoring and managing worksites. In further embodiments, the worksite monitoring and management includes standards compliance, risk mitigation (e.g., risks to safety, security, health, breakdown, SLA, quality, costs, etc.), and emergency response coordination (including automated or manually coordinated response).

Advantages of the systems and platforms described herein allow worksite managers to monitor the real time condition of the working environment. The platform comprising various modules to monitor all the aspects of the worksite can predict the potential damages and risks (e.g., risks to safety, security, health, breakdown, SLA, quality, costs, etc.). With an alarm and alerting system on the platform, key personnel (such as managers, operators, workers, administrators, government officers, etc) and automated devices can respond to the potential damages in a shortest time frame. Moreover, the platform can provide feedbacks on quality control, resource allocation and performance indication. The enterprises using the platform can reduce costs and enhance operating performance.

In one aspect, disclosed herein is a computing platform for worksite monitoring, the platform comprising: (a) one or more sensing devices installed on one or more objects on a worksite, wherein each of the one or more sensing devices comprises one or more sensors and a signal acquisition module configured to read sensing signals from the one or more sensors; (b) a server with a server processor configured to provide a server user with a server application, wherein the server application comprises a contextual data engine, an anti-collision module, a risk management module, and an operation resources planning module; and (c) a mobile device with a mobile processor configured to provide a mobile user with a mobile application. In some embodiments, each of the one or more sensing devices further comprises: an embedded processor and an embedded operating system comprising an embedded multi-application platform. In some embodiments, each of the one or more sensing devices further comprises a data storage storing the sensing signals. In some embodiments, each of the one or more sensing devices further comprises a command and control module configured to control the one or more objects. In some embodiments, each of the sensing devices further comprises an embedded human-machine-interface (HMI). In some embodiments, each of the one or more sensing devices further comprises an embedded actionable data server. In some embodiments, each of the one or more sensing devices further comprises a communication module configured to (1) transmit the sensing signals to the server and (b) receive instruction signals from the server. In some embodiments, each of the instruction signals comprises a control on an object. In some embodiments, each of the sensing signals comprises information of an object on the worksite, the information comprising one or more of: a location, a direction, a rotation angle, a rotation speed, a speed, an acceleration, an angular acceleration, a lifting angle, a pressure, a temperature, a concentration, a force, a torque, a stability, and a balance. In some embodiments, the one or more sensing devices comprise one or more of: one or more video cameras, one or more sound recorders, one or more global positioning systems, and one or more weather stations. In some embodiments, the one or more sensors comprise one or more of the following: one or more position sensors, one or more RF tags, one or more GPS tracking units, one or more wind speed sensors, wind direction sensors, one or more temperature sensors, one or more rain sensors, one or more snow sensors, one or more liquid sensors, one or more gas sensors, one or more carbon dioxide sensors, one or more carbon monoxide sensors, one or more oxygen sensors, one or more motion sensors, one or more speed sensors, one or more acceleration sensors, one or more pressure sensors, one or more torque sensors, one or more force sensors, one or more load sensors, one or more electric current sensors, one or more electric voltage sensors, one or more stability sensor, and one or more balance sensors. In some embodiments, the contextual data engine is configured to analyze the sensing signals to track locations of the one or more objects. In some embodiments, the contextual data engine is configured to record operation logs of the one or more objects. In some embodiments, the contextual data engine is configured to record maintenance performed on the one or more objects. In some embodiments, the contextual data engine is configured to infer operational context of the one or more objects and of the worksite. In some embodiments, the anti-collision module is configured to predict a collision between two or more objects. In some embodiments, the anti-collision module is configured to identify and track the locations of workers on the worksite. In some embodiments, the anti-collision module is configured to monitor a pediatrician collision. In some embodiments, the operation resources planning module is configured to record skills of workers on the worksite. In some embodiments, the operation resources planning module is configured to track materials or products in a logistic chain. In some embodiments, the operation resources planning module is configured to control access to one or more of the following: the worksite, the one or more objects, the one or more sensing devices. In some embodiments, the operation resources planning module is configured to monitor a status of a task. In some embodiments, the operation resources planning module is configured to evaluate a status or performance of a project. In some embodiments, the operation resources planning module is configured to recommend resource allocation. In some embodiments, the operation resources planning module is configured to monitor energy consumption. In some embodiments, the operation resources planning module is configured to monitor a usage of an asset. In some embodiments, the operation resources planning module is configured to allow the server user to set up one or more operation rules of the worksite. In some embodiments, the one or more operation rules comprise one or more of the following: a compliance with a law, a safety rule, a security rule, a health rule, a traffic rule, a transportation rule, a collision rule, an object movement rule, a risk management rule, and a rescue rule. In some embodiments, the risk management module is configured to produce an alert when an operation rule is violated. In some embodiments, the risk management module is configured to monitor a health condition of workers on the worksite. In some embodiments, the risk management module is configured to contact a health care provider when a risk occurs. In some embodiments, the server application further comprises an interface to allow the server user to navigate the worksite on a display of the server. In some embodiments, the mobile application comprises a software module configured to display a real-time condition of the worksite. In some embodiments, the real-time condition comprises one or more of: a map of the worksite, a scene of the worksite, an operation zone of the one or more objects, a predicted movement of the one or more objects, a predicted location of the one or more objects, a weather condition, a workforce condition, and a supply chain condition. In some embodiments, the mobile application comprises a software module configured to receive an alert from the server application and generate an alarm to the mobile user. In some embodiments, the platform further comprises a cloud storage comprising (a) a software module configured to synchronize the sensing signals across the one or more sensing devices, the server, and the mobile device; and (b) a software module configured to replicate the sensing signals in the cloud storage. In some embodiments, the worksite comprises one or more of: a construction site, an airport, a factory, a port, a mining site, a nuclear plant, a power plant, a shipyard, a building, an air craft, a battle zone, a freeway, a road, a school, a disaster area, and an aerospace. In some embodiments, the one or more objects comprise one or more of: one or more vehicles, one or more cranes, one or more aircrafts, one or more cargo, one or more machines, one or more freights, one or more assets, one or more raw materials, one or more gates, one or more heavy equipments, one or more power plants, one or more buildings, and one or more tractors.

In another aspect, disclosed herein is a computing system for worksite monitoring comprising: (a) one or more sensing devices installed on one or more objects on a worksite; (b) a server comprising a server processor and an operating system, wherein the server is coupled to the one or more sensing devices and is configured to provide a server application, the server application comprising a contextual data engine, an anti-collision module, a risk management module, and an operation resources planning module. In some embodiments, the one or more sensing devices comprise one or more of: one or more video cameras, one or more sound recorders, one or more global positioning systems, and one or more weather stations. In some embodiments, the one or more sensing devices comprise one or more of the following: one or more position sensors, one or more RF tags, one or more GPS tracking units, one or more wind speed sensors, wind direction sensors, one or more temperature sensors, one or more rain sensors, one or more snow sensors, one or more liquid sensors, one or more gas sensors, one or more carbon dioxide sensors, one or more carbon monoxide sensors, one or more oxygen sensors, one or more motion sensors, one or more speed sensors, one or more acceleration sensors, one or more pressure sensors, one or more torque sensors, one or more force sensors, one or more load sensors, one or more electric current sensors, one or more electric voltage sensors, one or more stability sensor, and one or more balance sensors. In some embodiments, the contextual data engine is configured to receive sensing signals from the one or more sensing devices and analyze the sensing signals to track locations of the one or more objects. In some embodiments, the contextual data engine is configured to record operation logs of the one or more objects. In some embodiments, the contextual data engine is configured to record maintenance performed on the one or more objects. In some embodiments, the contextual data engine is configured to infer operational context of the one or more objects and of the worksite. In some embodiments, the anti-collision module is configured to predict a collision between two or more objects. In some embodiments, the anti-collision module is configured to identify and track the locations of workers on the worksite. In some embodiments, the anti-collision module is configured to monitor a pediatrician collision. In some embodiments, the operation resources planning module is configured to record skills of workers on the worksite. In some embodiments, the operation resources planning module is configured to track materials or products in a logistic chain. In some embodiments, the operation resources planning module is configured to control access to one or more of the following: the worksite, the one or more objects, the one or more sensing devices. In some embodiments, the operation resources planning module is configured to monitor a status of a task. In some embodiments, the operation resources planning module is configured to evaluate a status or performance of a project. In some embodiments, the operation resources planning module is configured to recommend resource allocation. In some embodiments, the operation resources planning module is configured to monitor energy consumption. In some embodiments, the operation resources planning module is configured to monitor a usage of an asset. In some embodiments, the operation resources planning module is configured to allow the server user to set up one or more operation rules of the worksite. In some embodiments, the one or more operation rules comprise one or more of the following: a compliance with a law, a safety rule, a security rule, a health rule, a traffic rule, a transportation rule, a collision rule, an object movement rule, a risk management rule, and a rescue rule. In some embodiments, the risk management module is configured to produce an alert when an operation rule is violated. In some embodiments, the risk management module is configured to monitor a health condition of workers on the worksite. In some embodiments, the risk management module is configured to contact a health care provider when a risk occurs. In some embodiments, the server application further comprises an interface to allow a server user to navigate the worksite on a display of the server.

In another aspect, described herein are one or more sensing and control devices installed on one or more objects on a worksite, wherein each sensing device comprises: a computing processor; an embedded operating system; one or more sensors; one or more controllers (e.g., actioners, actuators, etc.); a data storage; a command and control module; an embedded human-machine-interface (HMI) for operators and workers (e.g., a LCD, touchscreen, audio interface, voice command system, etc.); an embedded actionable data server (for real time data collection, remote control, and/or remote applications services); an embedded multi-application platform; a signal acquisition module configured to read and store signals from the sensors, wherein the signals comprise a location; a data synchronization module for replication of data to a worksite server (and re-synchronization in the event of power loss); and a communication module configured to transmit and/or receive signals to and/or from a server application, the sensors, and/or the controllers.

In another aspect, described herein are servers including one or more server processors configured to provide a server user with the server application comprising: a software module configured to allow the server user to set up a plurality of operation rules of the worksite; a software module configured to receive the signals from the sensing devices and track the locations of the objects on the worksite; a software module configured to predict a collision between two or more objects; and a software module configured to produce an alert when an operation rule is violated.

In another aspect, described herein are mobile devices with one or more mobile processors configured to provide a mobile user with a mobile application comprising: a software module configured to display a predicted collision and/or a violation on the worksite, and a software module configured to receive the alert from the server application and generate an alarm;

In another aspect, described herein is cloud storage comprising: a software module configured to synchronize the signals and data among the sensing devices, the server, and the mobile device; and a software module configured to replicate the signals and data in the cloud storage.

In some embodiments, the systems and platforms described herein comprise a plurality of server levels. In a particular embodiment, the systems and platforms described herein comprise three server levels. For example, in various embodiments, the server levels include: embedded servers in the objects, site servers, and cloud servers. In further embodiments, each modular application described herein optionally runs at different levels (exclusive, collaborative or simultaneous).

In some embodiments, the systems and platforms described herein comprise a plurality of storage levels. In a particular embodiment, the systems and platforms described herein comprise three storage levels. For example, in various embodiments, the storage levels include, embedded storage, site server storage, and cloud storage. In further embodiments, embedded data are replicated in the site server, and all worksite data are replicated on the cloud storage. An advantage of this arrangement is that at the main time the worksite instance in the cloud storage is replicated in the site storage, then if there is a loss of the internet connectivity between the site and the cloud, the local operations modules continue to work without stopping the production line. Another advantage of this arrangement is that the embedded object instance in the worksite storage is replicated in the embedded storage as well, then if there is a loss of the connectivity between the object and the site server, the embedded operations applications continue to work.

DETAILED DESCRIPTION OF THE INVENTION

Figure 1:
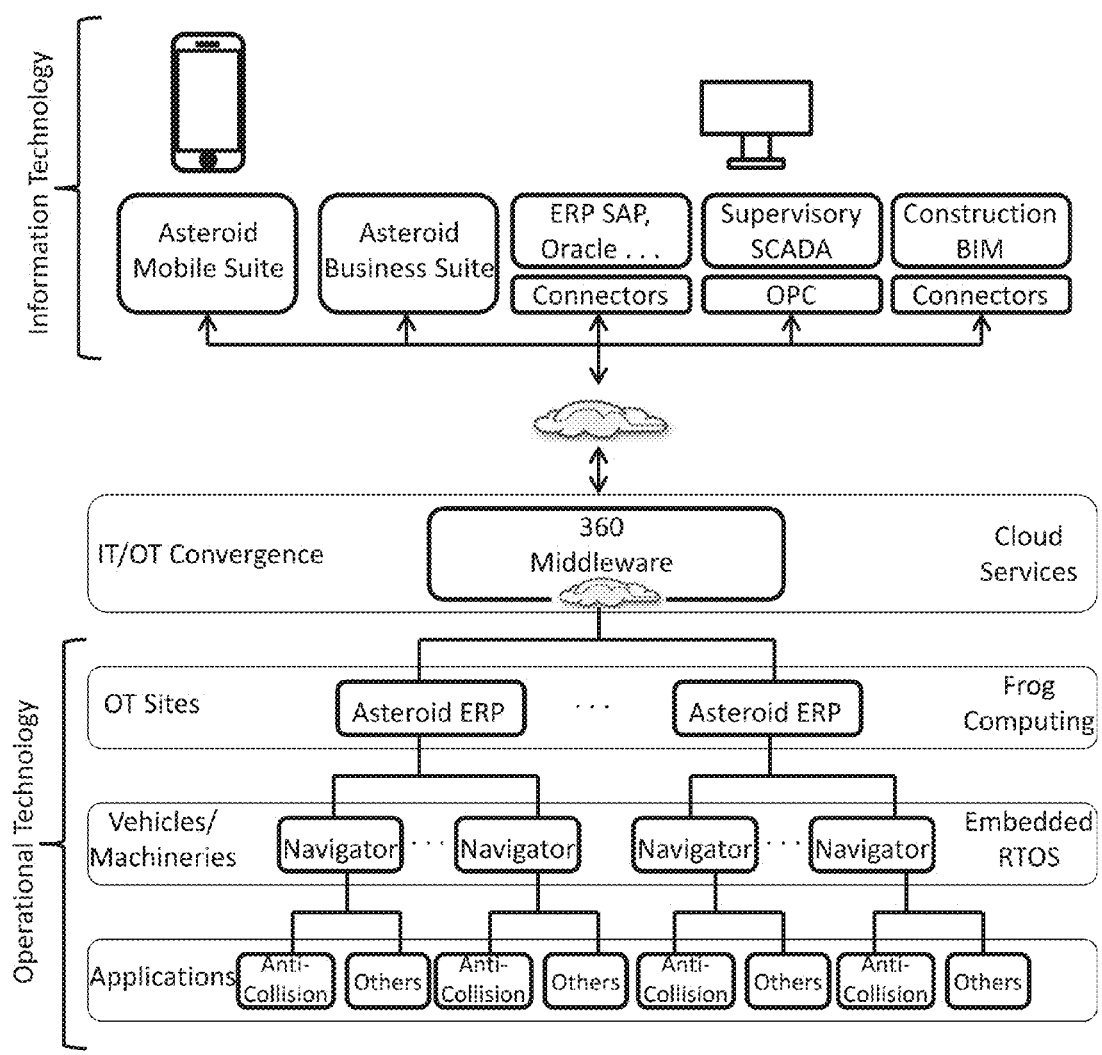
FIG. 1 shows a non-limiting example of a schematic diagram of an embodied platform; in this case, the server application (called 360 Middleware) was linked to worksites where vehicles were installed with sensing devices and GPS navigator, allowing the server application to receive the operation data of the vehicles and to monitor the movement of the vehicles.

Safety, security and health on a worksite (e.g., constructions, airports, shipyards, factories, and mines) are critical factors to maintain a quality working environment. Existing systems of monitoring worksites largely focus on a single aspect of safety, security or health, rather than integrating all pieces of information on a single platform. Furthermore, the lack of the integration cannot predict the potential damages and collisions, leading to disasters taking place. Therefore, a new system is necessary to avoid the damages, and it in turn hopefully can enhance the quality of working environment.

Advantages of the systems and platforms allow worksite managers to monitor the real time condition of the working environment. The platform comprising various modules to monitor all the aspects of the worksite can predict the potential damages. With an alarm system on the platform, the managers and workers can respond to the potential damages in a shortest time frame. Moreover, the platform can provide feedbacks on quality control, resource allocation and performance indication. The enterprises using the platform can reduce costs and enhance operating performance.

Described herein, in various embodiments, is a platform comprising: (a) one or more sensing devices installed on one or more objects on a worksite, wherein each sensing device comprises a computing processor, an embedded operating system, one or more sensors, a data storage, a signal acquisition module configured to read and store signals from the sensors wherein the signals comprise a location, and a communication module configured to transmit the signals to a server application; (b) a server with a server processor configured to provide a server user with the server application comprising: (i) a module to allow the server user to set up a plurality of operation rules of the worksite; (ii) a module to receive the signals from the sensing devices and track the locations of the objects on the worksite; (iii) a module to predict a collision between two or more objects; and (iv) a module to produce an alert when an operation rule is violated; (c) a mobile device with a mobile processor configured to provide a mobile user with a mobile application comprising: a module to display a real time condition of the worksite, and a module to receive the alert from the server application and generate an alarm; (d) a cloud storage comprising (i) a module to synchronize the signals and data among the sensing devices, the server, and the mobile device; and (ii) a module to replicate the signals and data in the cloud storage. The modules in the platform may be implemented by software, hardware, or combination of them.

Also described herein, in various embodiments, is a collision prediction system comprising: (a) one or more sensing devices installed on one or more objects on a worksite, wherein each sensing device includes a computing processor, an embedded operating system, one or more sensors, a data storage, a signal acquisition module configured to read and store signals from the sensors wherein the signals comprise a location, and a communication module configured to transmit the signals to a server application; (b) a server with a server processor configured to provide a server user with the server application comprising: (i) a module to allow the server user to set up a plurality of operation rules of the worksite; (ii) a module to receive the signals from the sensing devices and track the locations of the objects on the worksite; (iii) a module to predict a collision between two or more objects; and (iv) a module to produce an alert when an operation rule is violated; (c) a mobile device with a mobile processor configured to provide a mobile user with a mobile application comprising: (i) a module to display the predicted collision of the worksite, and (ii) a module to receive the alert from the server application and generate an alarm. The modules in the platform may be implemented by software, hardware, or combination of them.

Also described herein, in various embodiments, is a collision emergency response system comprising: (a) one or more sensing devices installed on one or more objects on a worksite, wherein each sensing device comprises a computing processor, an embedded operating system, one or more sensors, a data storage, a signal acquisition module configured to read and store signals from the sensors wherein the signals comprise a location, and a communication module configured to transmit the signals to a server application; (b) a server with a server processor configured to provide a server user with the server application comprising: (i) a module to allow the server user to set up a plurality of operation rules of the worksite, and (ii) a module to detect a violation in one or more of the operation rules and produce an alert; (c) a mobile device with a mobile processor configured to provide a mobile user with a mobile application comprising: (i) a module to display the violation on the worksite, and (ii) a module to receive the alert from the server application and generate an alarm; and (d) a cloud storage comprising (i) a module to synchronize the signals and data among the sensing devices, the server, and the mobile device; and (ii) a module to replicate the signals and data in the cloud storage. The modules in the platform may be implemented by software, hardware, or combination of them.

CERTAIN DEFINITIONS

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Worksite

In some embodiments, the platforms, systems, software applications, media, and methods described herein include a worksite. Non-limiting examples of worksites include construction sites, airports, factories, ports, mining sites, nuclear plants, power plant, shipyards, buildings, aircrafts, battle zones, freeways, roads, schools, disaster areas, and aerospace. In some embodiments, the platform monitors a single worksite. In some cases, the platform monitors two or more worksites. When there are two or more worksites monitored by the platform, the worksites may be in the same type or in different types. For example, a construction company simultaneously monitors two constructions sites in different cities; a government agency may simultaneously monitor the maintenance progresses on a freeway and on a city road.

Sensing Device

In some embodiments, the platforms, systems, software applications, media, and methods described herein include a sensing device, or use of the same. A sensing device may be installed in an object on a worksite, wherein each sensing device comprises one or more of the following: a computing processor, an embedded operating system, one or more sensors, a data storage, a signal acquisition module configured to read and store signals from the sensors, and a communication module configured to transmit the signals to a server application. The signals recorded by a sensor may comprise a location. In some cases, the signals may comprise a physical quantity and/or a chemical quantity. Non-limiting examples of sensing devices include cameras, video cameras, global positioning systems, weather stations, carbon monoxide detectors, smoke detectors, light detectors, and pressure sensing systems.

A sensing device is coupled to one or more sensors. Two or more sensors coupled with a sensing device may be a single type, or different types. Non-limiting examples of sensors include: RF tags, light sensors, electromagnetic wave sensors, wind sensors, rain sensors, snow sensors, soil sensors, water sensors, liquid sensors, gas sensors, carbon dioxide sensors, carbon monoxide sensors, oxygen sensors, chemical sensors, toxicity sensors, acid sensors, alkaline sensors, speed sensors, temperature sensors, pressure sensors, load sensors, weight sensors, torque sensors, force sensors, electric current sensors, and voltage sensors.

In some embodiments, one or more sensing devices are coupled with one or more other modules in the platforms, systems, software applications, media, and methods. The sensing devices transmit the collected signals to the other modules, and the modules analyze the signals to control the objects on the worksites to achieve anti-collision. More details are described below.

Operation Rules

In some embodiments, the platforms, systems, software applications, media, and methods described herein include an operation rule, setting up an operation rule, and/or use of the same. An operation rule may be a rule in compliance with a law or multiple laws. Operation rules may cover different aspects of a worksite; non-limiting examples include safety, security, health, traffic, transportation, collision, and movement. An operation rule may contain a description associated with one or more quantities. By way of non-limiting examples, a heavy truck should keep a distance of at least 10 meters away the previous vehicle; a worker should take a one hour break after working for four hours in a row; a concentration of carbon monoxide should be lower than 1 ppm; the operating zone of a crane should not overlap with that of another crane.

Objects on Worksite

In some embodiments, the platforms, systems, software applications, media, and methods described herein include one or more objects present on the worksite. Non-limiting examples of objects include people, animals, vehicles, ships, cranes, aircrafts, cargos, machines, freights, assets, materials, gates, heavy equipments, tractors, power plants, factories, and buildings. In further embodiments, an object on a worksite is installed, or attached, with one or more sensing devices. Coupling an object with one or more sensing devices allows the sensing devices to reveal the condition (based on physical/chemical measurements, such as locations, latitude, altitude, temperature, speed, velocity, acceleration, pressure, electrical properties, current, voltage, torque, force, etc) of the object. For example, a sensing device determines the location of the object, another can measure the load of the object, and another can reveal the operating temperature of the object.

Worksite Condition

In some embodiments, the platforms, systems, software applications, media, and methods described herein include displaying a worksite condition. Displaying the worksite condition is made on a digital screen. The screen is coupled to any kinds of digital processing devices, e.g., mobile phones, wearable electronics devices, portable computers, and servers. In some embodiments, the display of the worksite condition shows one or more of the following non-limiting examples: a map of the worksite, a scene of the worksite, an operation zone of an object, a predicted movement of an object, a predicted location of an object, a predicted event, a weather condition, a workforce condition, an objects condition (e.g., asset maintenance, etc.), supply chain, and a job or task condition (e.g., status, quality level, SLA, costs, etc.).

In some embodiments, the display comprises an interactive interface to view various types of information. The interactive interface allows the user to use finger touch or a computer peripheral (e.g., mouse, keyboard, microphone, touch pen, etc) to interact with the display. In further embodiments, the interactive interface allows the user to locally or remotely control a worksite object.

Predictive Anti-Collision Module

In a particular example, operation rules are configured in a predictive anti-collision module. In another particular example, a worksite condition is collision potential, which is monitored and displayed by a predictive anti-collision module.

A predictive anti-collision module, for example, monitors objects such as equipment and vehicles on a worksite to predict collisions. In some embodiments, the predictive anti-collision module is operates dynamically by integrating motion sensors (sensing e.g., positions, speeds, acceleration, stability, balance, etc.), weather conditions (e.g., wind speed, wind direction, etc.), and equipment loads and torques. In further embodiments, the predictive anti-collision module includes an anti-balancing system.

In some embodiments, the predictive anti-collision module described herein integrates an auto-pilot feature, which over rides operator commands and takes control to avoid automatically the collision in case of critical risk. In further embodiments, the auto-pilot uses the embedded controller interface for this purpose. In some embodiments, the anti-collision module optionally run in the embedded level, at the site server, or cloud level. In further embodiments, multiple anti-collision modules optionally run in parallel for redundancy purpose in view to match high safety standards.

Server Application

In some embodiments, the platforms, systems, software applications, media, and methods described herein include a server hosting a server application, or use of the same. The server application may contain one or more of the following modules: a module to allow the server user to set up a plurality of operation rules of the worksite; a module to receive the signals from the sensing devices and track the locations of the objects on the worksite; a module to predict a collision between two or more objects; a module to produce an alert when an operation rule is violated; a module to identify and track the locations of people on the worksite; a module to record the skills of people on the worksite; a module to monitor the health condition of people on the worksite; a module to record the operation logs of the objects; a module to record the maintenance performed on the objects; a module to track materials in a logistics chain; a module to track products in a logistics chain; a module to control access to the worksite; a module to control access to a part of the worksite; a module to monitor the status of a task; a module to evaluate the performance of a project; a module to monitor the status of a project; a module to evaluate the performance of a project; a module to recommend resource allocation; a module to monitor energy consumption; a module to monitor pediatrician collision; a module to navigate the worksite; a module to monitor the usage of an asset; a module to integrate enterprise resource planning.

The embodied modules on a platform may further allow real time access to the data associated with the modules. The data may be password protected, or may be encrypted. The access may be limited to the users of the platforms. Sometimes the access may be allowed for a third party. The access to the data may be made through a wireless communication network.

Cloud Storage

In some embodiments, the platforms, systems, software applications, media, and methods include a cloud storage, or use of the same. The cloud storage may be on the same as the server hosting the server application, or it may be on another independent server. The cloud storage may be associated with a module to synchronize the signals and data among the sensing devices, the server, and the mobile device. Another possible module associated with the cloud storage is to replicate the signals and data in the cloud storage. The server application may comprise these modules associated with cloud storage, or these modules are independent of the server application.

Operation Resource Planning

In some embodiments, the platforms, systems, software applications, media, and methods include a module for operation resource planning, or use of the same. The operation resource planning module is coupled with sensing devices to collect the signals measured by the sensing devices. Once the signals are collected, the module analyzes the signals to identify a resource need. Non-limiting examples of the resource comprises staffing human workforce, allocating communication channel, arranging wireless networking among sensing devices and worksite objects, allocating health/medical resources, monitoring worksite assets, enhancing security, controlling access to assets, and providing real-time customer services.

In some embodiments, the resource is across different industries, e.g., construction, oil & gas, mining, airports, transportation, ports, health care, financial, banking, recycling, and waste management. For instance, when a construction site is predicted to be short of concrete, the resource planning module can measure the demand and automate contacting a supplier in the mining industry to deliver more concrete to the construction site.

Contextual Data Engine

In some embodiments, the platforms, systems, software applications, media, and methods include a contextual data engine, or use of the same. The contextual data engine is built and operated on an operating system. The contextual data engine converges database and application platform capabilities in-memory to transform transactions, analytics, text analysis, predictive and spatial processing so businesses can operate in real-time.

In some embodiments, the contextual data engine comprises an interface coupled to sensing devices to facilitate sensing and control.

In some embodiments, the contextual data engine comprises safety integrity level to enhance data exchange security.

In some embodiments, the contextual data engine comprises complex even processing (CEP). The contextual data engine is coupled to sensing devices to receive and analyze streams of signals. When the signals are received by the contextual data engine, the engine infers what events are happening and derives a conclusion from the signals. In some embodiments, the contextual data engine combines signals from multiple sources (e.g., multiple temporal signals from a single sensing device, and signals from multiple sensing devices) to infer events or patterns, which are then concluded with a more meaningful event (e.g., a potential collision, a weather impact, a possible disaster, a resource shortage, an opportunity, a threat, etc). The merit of the contextual data engine allows the worksite to respond to the events as fast as possible.

In some embodiments, the contextual data engine comprises a synchronization module. The synchronization module synchronizes all the events across the objects and sensing devices on the worksite, or even across the resource providers. For instance, a collision is predicted to take place, and the collision alarm is synchronized to cloud storage, server application, police office, fire station, and hospital. Meanwhile, synchronization module configures some other objects to stop working in order to allow fire trucks and ambulances to enter the worksite and access the assets.

In some embodiments, the contextual data engine comprises a communication module. The communication module relies on various protocols, such as peer-to-peer (P2P). Alternatively, the communication module comprises mobile device management (MDM), as sensing device and objects on the worksite exchange signals via wireless networking. By controlling and protecting the signals/data and configuration settings for all mobile devices in the network, MDM reduces costs induced by human support and business risks.

Digital Processing Device

In some embodiments, the platforms, systems, software applications, media, and methods described herein include a digital processing device, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

Non-Transitory Computer Readable Storage Medium

In some embodiments, the platforms, systems, software applications, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, software applications, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity Standalone Application In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, systems, software applications, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, software applications, media, and methods disclosed herein include one or more databases, or use of the same. In view of the disclosure provided herein, those of skill in the art will recognize that many databases are suitable for storage and retrieval of sensing signals, operation rules, and worksite operation data. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

EXAMPLES

The following illustrative examples are representative of embodiments of the software applications, systems, and methods described herein and are not meant to be limiting in any way. While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

Example 1

Diagram of an Embodied Platform

FIG. 1 illustrates a non-limiting example of a schematic diagram of an embodied platform to monitor potential collisions on a construction site. With reference to FIG. 1, the server application (called 360 Middleware) was linked to worksites where vehicles were installed with sensing devices and GPS navigator, so the server application can receive the operation data of the vehicles to monitor the movement of the vehicles. Besides the vehicles, the enterprise resource planning (ERP) software of the construction site was linked to the server application, so the worksite manager was able to monitor the real time status of the supply chain and the fleet. On the other hand, the server application can share the data with individual mobile devices or the remote computers installed with ERP software.

Example 2

Server Application Functionalities

Figure 2:
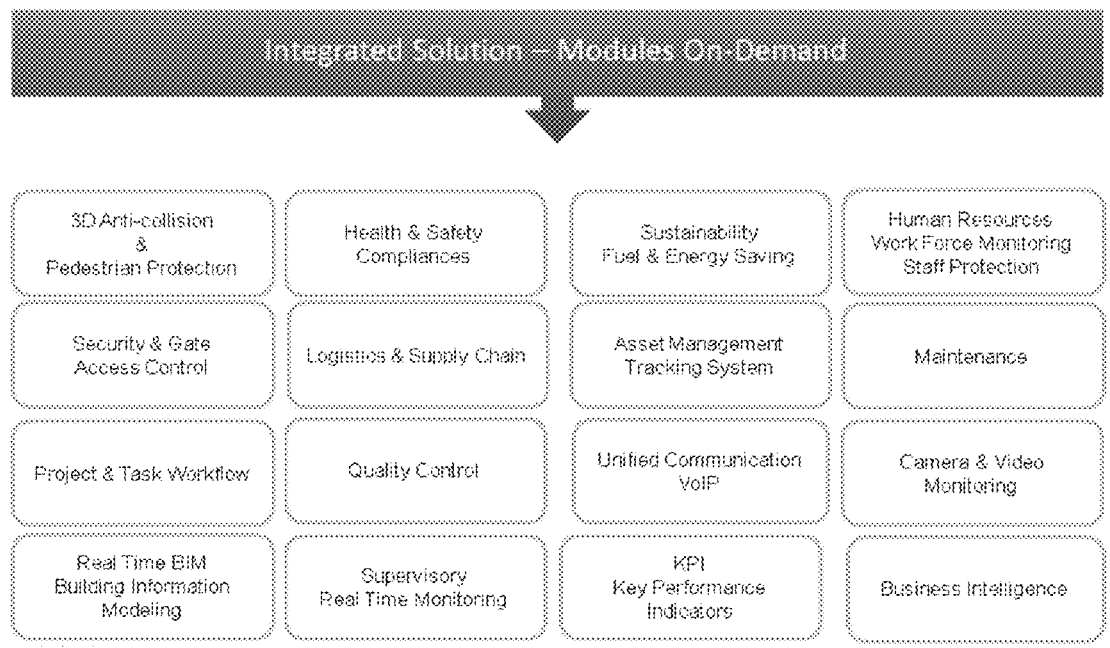
FIG. 2 shows a non-limiting example of functions embodied on a server application; in this case, the server application comprised logistics, health & safety, task management, supervisory, fleet management and tracking, anti-collision compliances enforcement, project management, key performance indicators, maintenance, security access control, quality control, business intelligence, human resources, staff protection, unified communication, voice over IP, energy saving, and reporting.

FIG. 2 illustrates an embodied server application comprising various types of software modules to monitor different aspects of a worksite. The modules included in the server application were logistics, health & safety, task management, supervisory, fleet management and tracking, anti-collision compliances enforcement, project management, key performance indicators, maintenance, security access control, quality control, business intelligence, human resources, staff protection, unified communication, voice over IP, energy saving, and reporting.

Example 3

Navigation of Multiple Worksites

Figure 3:
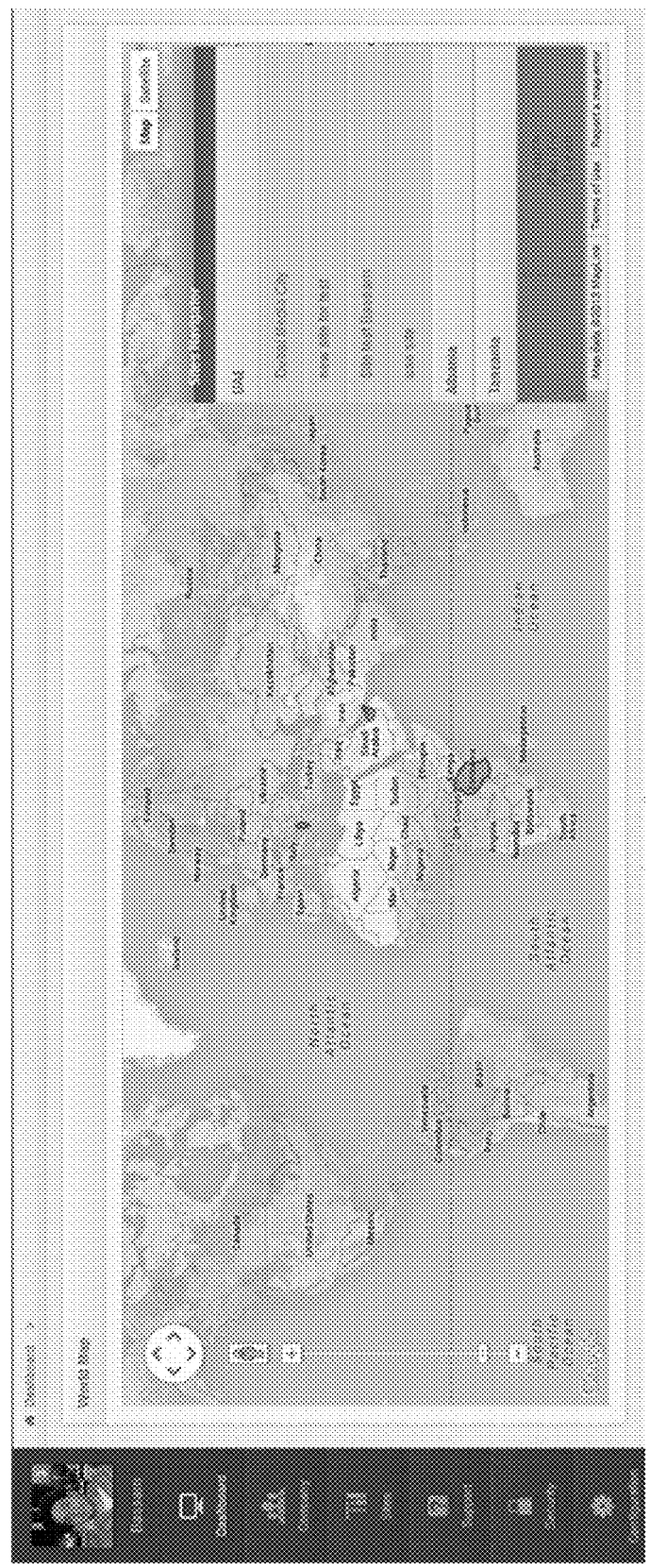
FIG. 3 shows a non-limiting example of real time monitoring of worksites; in this case, the platform visualized the countries (Tanzania, Albania, and United Arab Emirates) with construction sites on a global map.
Figure 4:
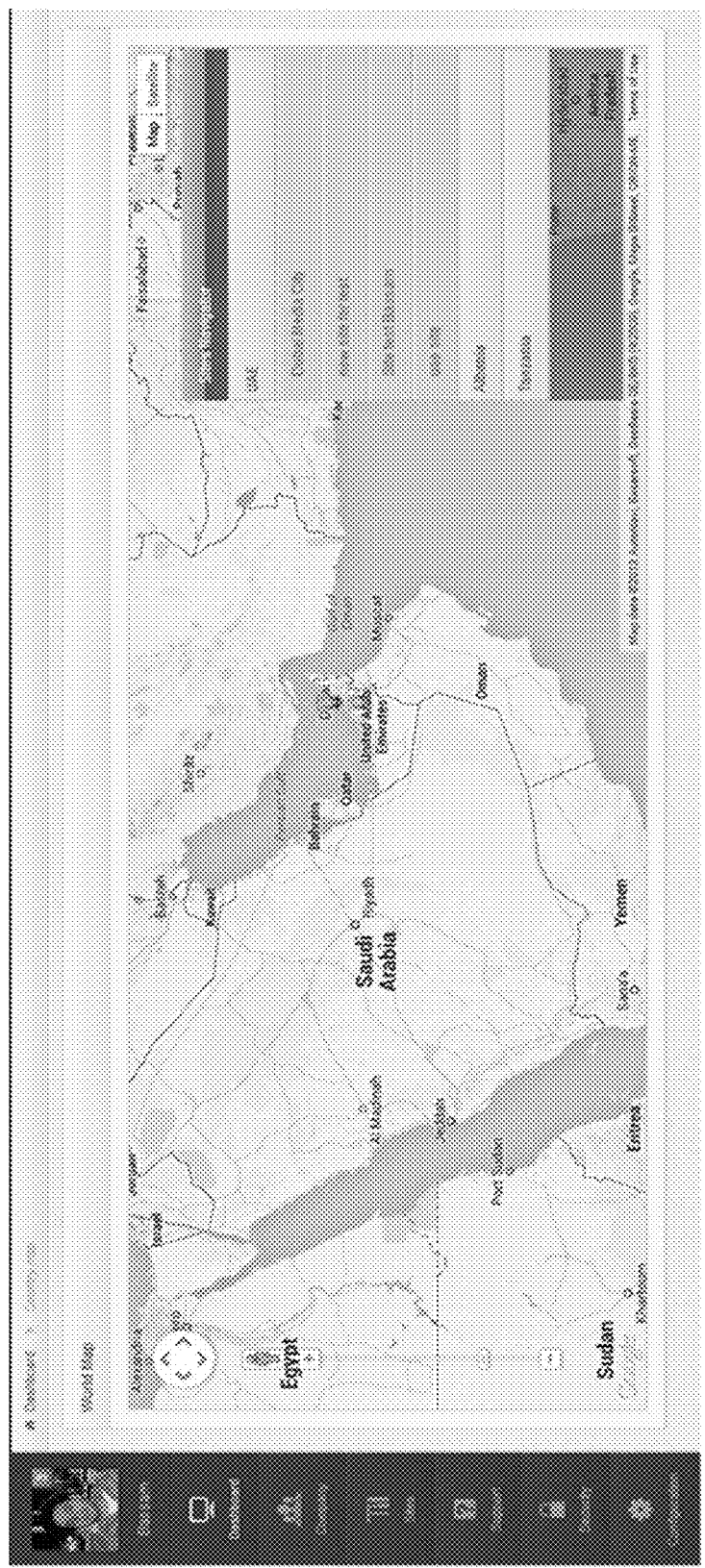
FIG. 4 shows a non-limiting example of real time monitoring of worksites; in this case, the platform visualized two worksites in the United Arab Emirates
Figure 5:
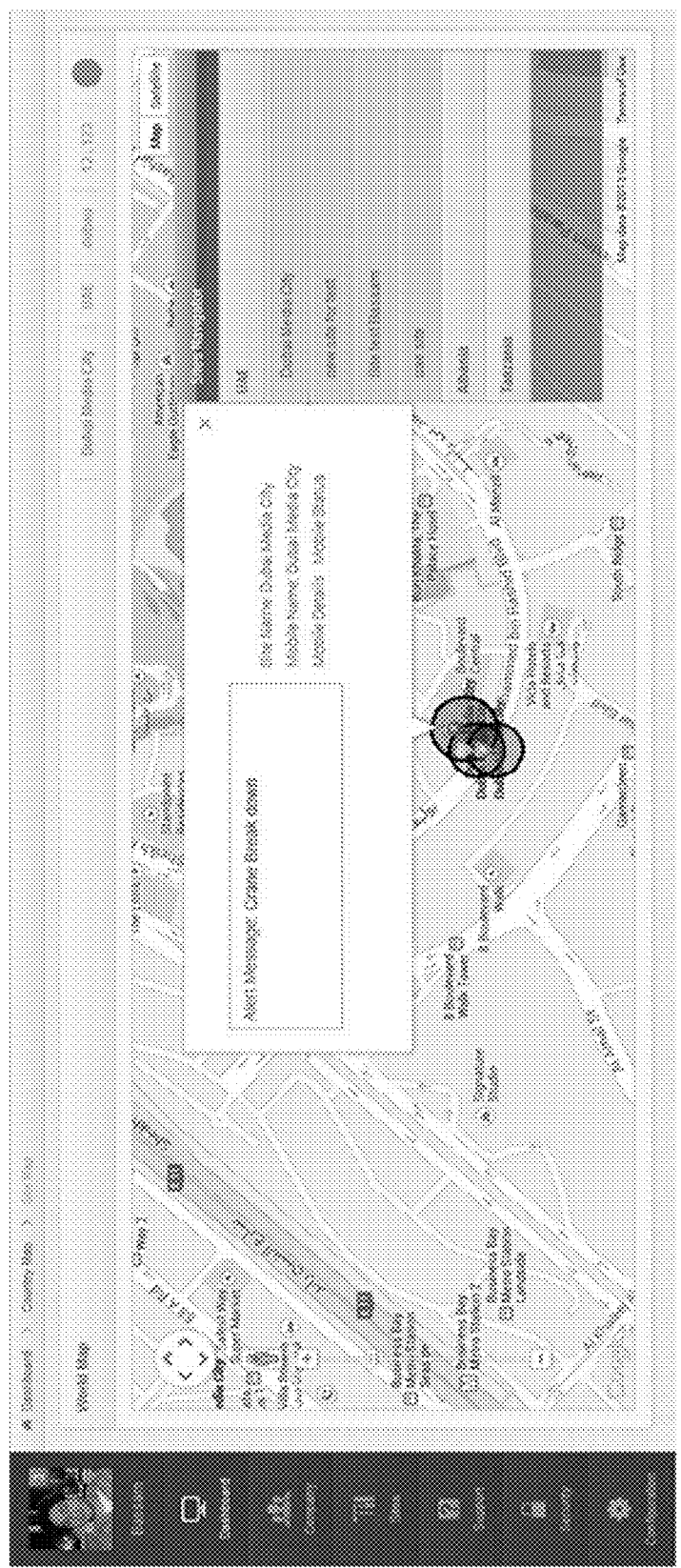
FIG. 5 shows a non-limiting example of real time monitoring of worksites; in this case, the platform visualized the working sites in Dubai and reported the crane operations.
Figure 6:
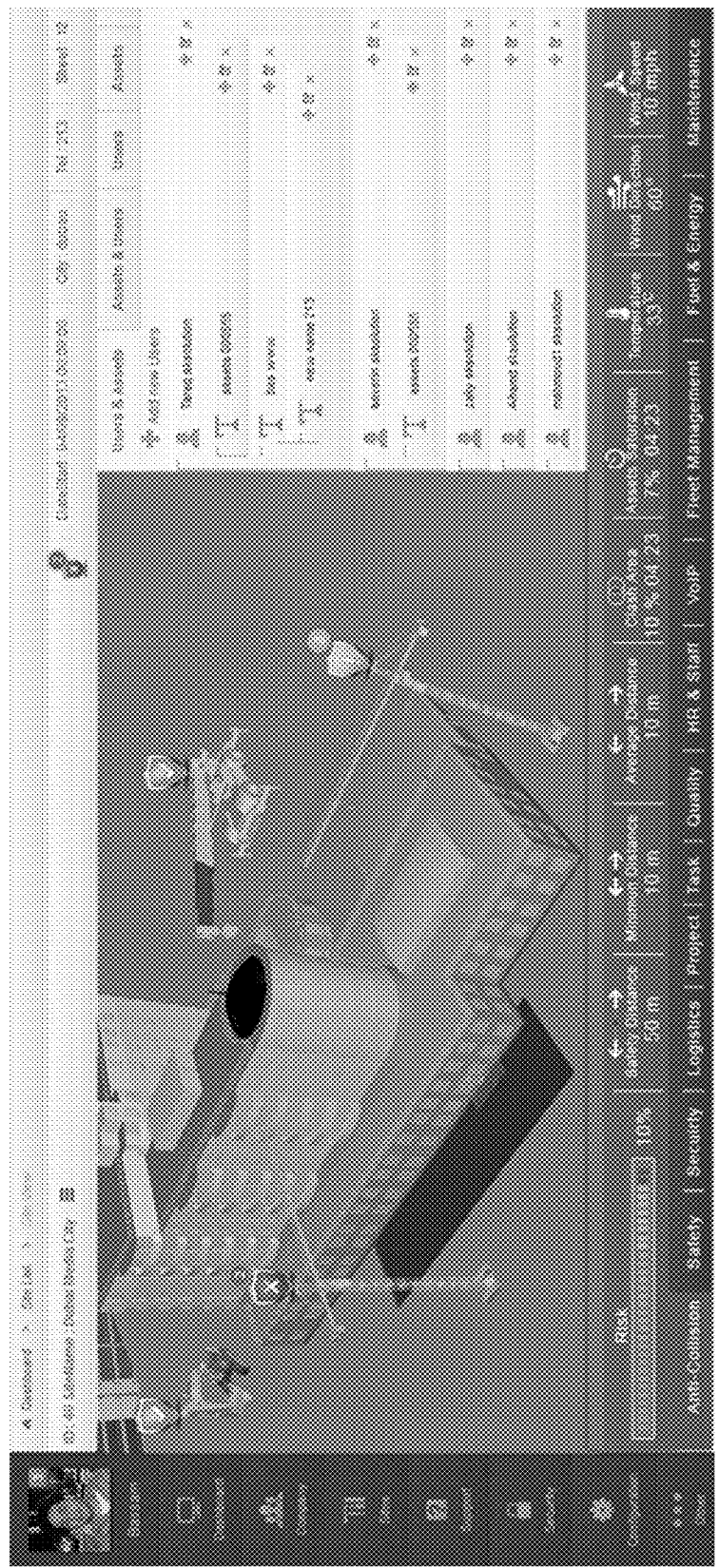
FIG. 6 shows a non-limiting example of real time monitoring of worksites; in this case, the platform displayed a 3-D view of the scene of the working site.

FIG. 3 to FIG. 6 illustrates a real time monitoring system installed on a server application. The user of the monitoring platform was a manager of a multi-national construction company. In FIG. 3, the manager was able to view the countries (Tanzania, Albania, and United Arab Emirates) with construction sites on a global map. In FIG. 4, the manager zoomed into the United Arab Emirates, and the map showed two working sites in the country. In FIG. 5, the manager selected one of the working sites in Dubai, and saw the report of the crane operations. One of the cranes was reported broken. In FIG. 6, the manager was able to see the 3D view of the scene of the working site, and visualization gave him the real time status of the construction equipments.

Example 4

Monitoring Operation of an Object

Figure 7:
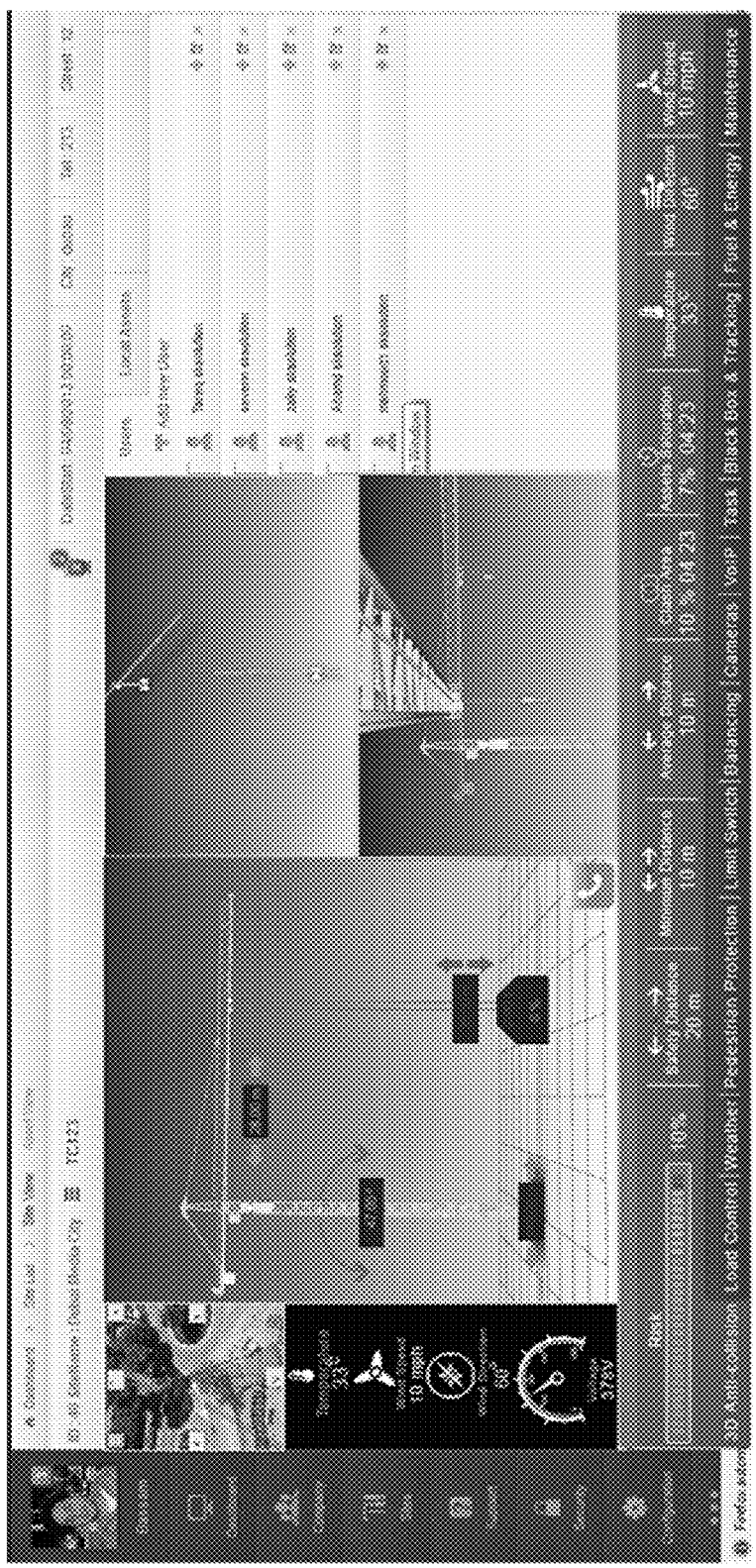
FIG. 7 shows a non-limiting example of monitoring an operation of a crane; in this case, the platform reported the working zone of a crane

FIG. 7 shows a non-limiting example of monitoring an operation of a crane. Through the platform, the manager was able to see the working zone of a crane. In addition, the sensing devices installed on the crane transmitted the signals (load, weight, torque, length, height, safety distance, temperature, wind direction, wind speed) to the server application, which enabled the manager to see real time operation of the crane.

Example 5

Displaying Current Condition of Worksite

Figure 8:
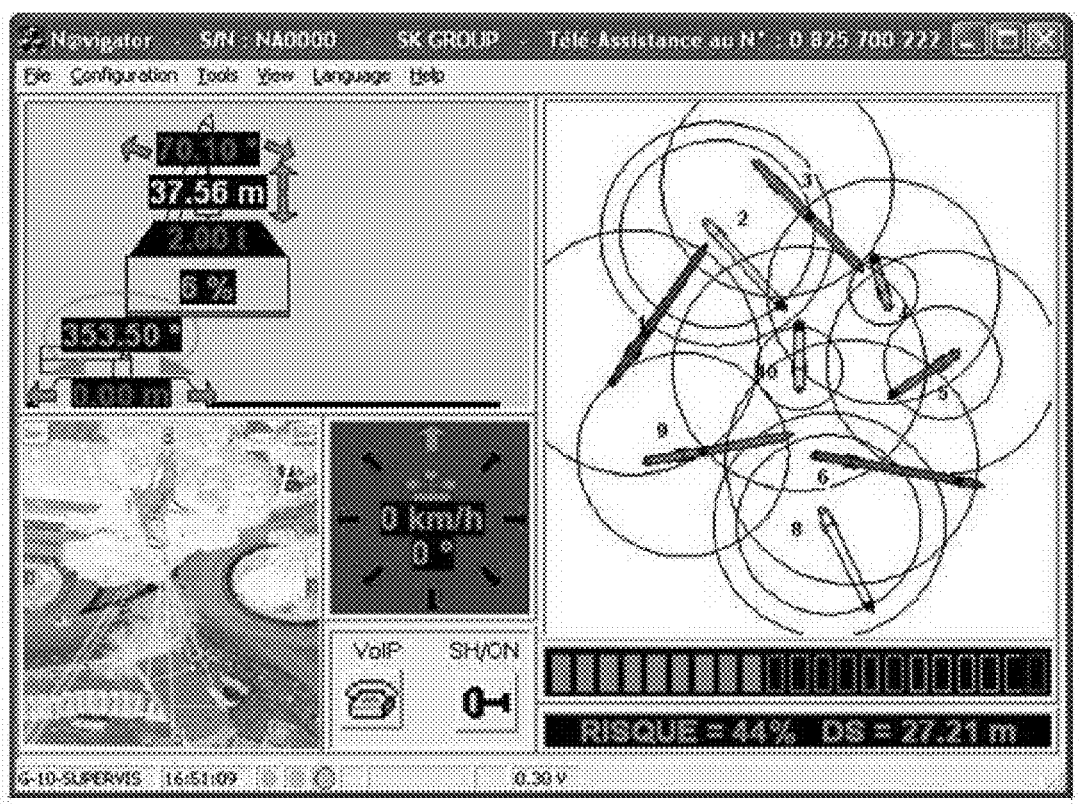
FIG. 8 shows a non-limiting example of displaying object deployment on a worksite; in this case, the platform displayed the deployment of 10 cranes on a construction site and evaluated the risk factor of the current deployment was 44%.

FIG. 8 shows a mobile application that displayed the deployment of 10 cranes on a construction site. The platform collected the sensing signal from every crane, and assembled the signals on a map to visualize the deployment of 10 cranes. The visualization enabled a user to see operation parameters of the cranes. The platform further evaluated that the risk factor of the current deployment was 44%.

Figure 9:
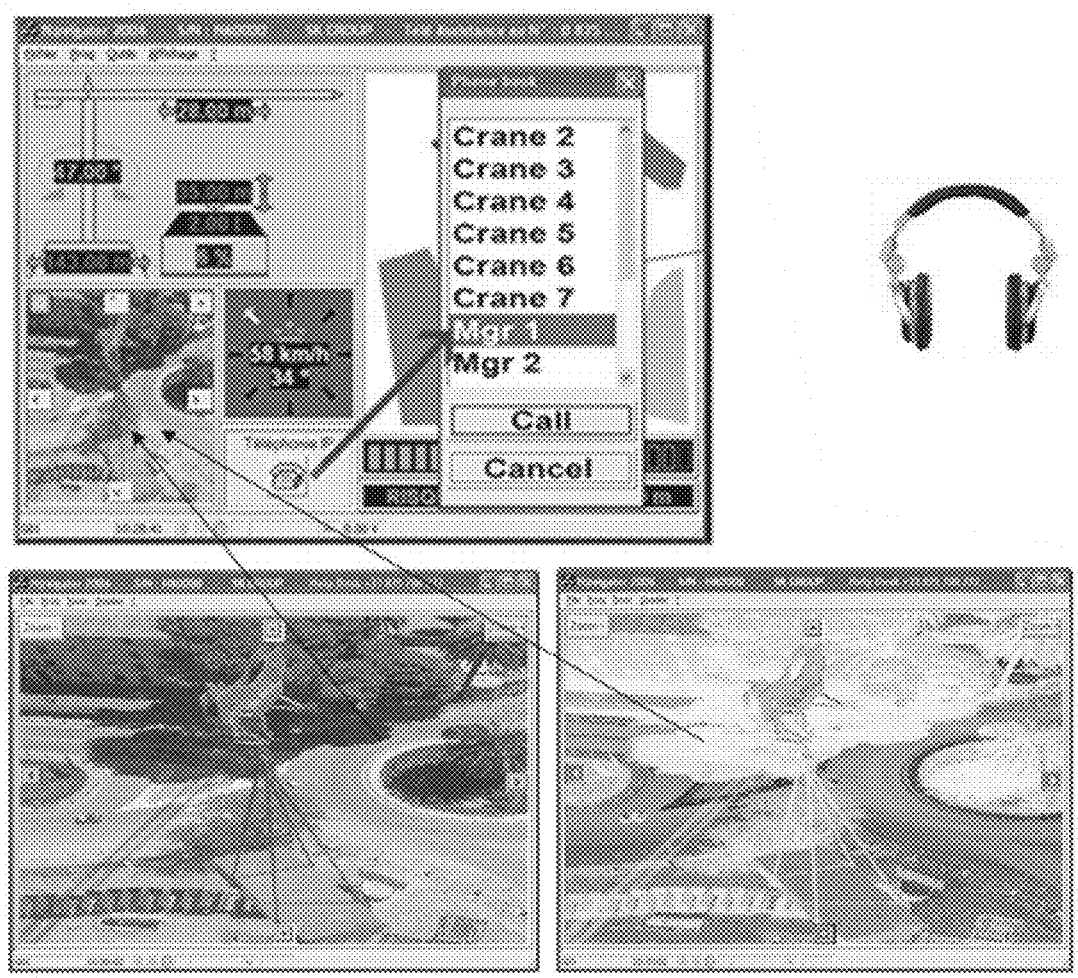
FIG. 9 shows a non-limiting example of displaying object operation on a worksite; in this case, the crane operator and the worksite manager were able to zoom into the load that a crane was carrying.

In FIG. 9, the crane operator and the worksite manager were able to zoom into the load that a crane was carrying. With the video camera installed on the crane, the monitor platform allowed the crane operator and the worksite manager to monitor the dimensions of the crane, the location of the crane, and the load carried by the crane.

Example 6

Operation Resource Planning

Figure 10:
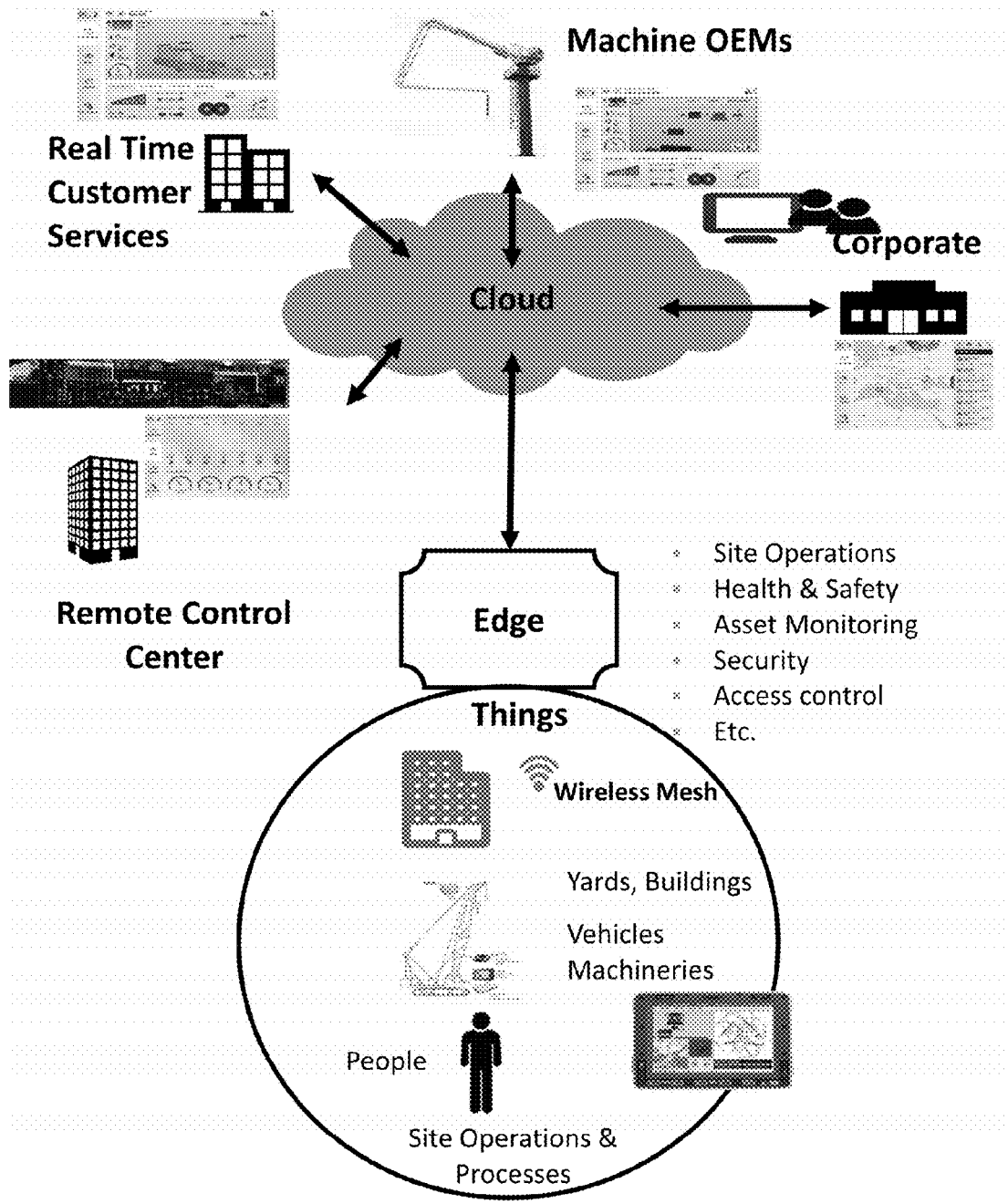
FIG. 10 shows a non-limiting example of operation resource planning; in this case, a platform integrates various components associated with the worksite.

FIG. 10 shows example architecture of the platform for operation resource planning. The platform integrated various components associated with the worksite. The back-end included real time customer services, machine OEMs, corporate, and remote control center; the front-end includes people vehicles, machineries, yards, building, sensing devices, mobile devices, and wireless network. The platform was centered at cloud storage, where the platform synchronized all the resources information. Furthermore, the cloud interacted with the front-end via an edge, which comprised site operations, health & safety, asset monitoring, security, access control, etc.

Figure 11:
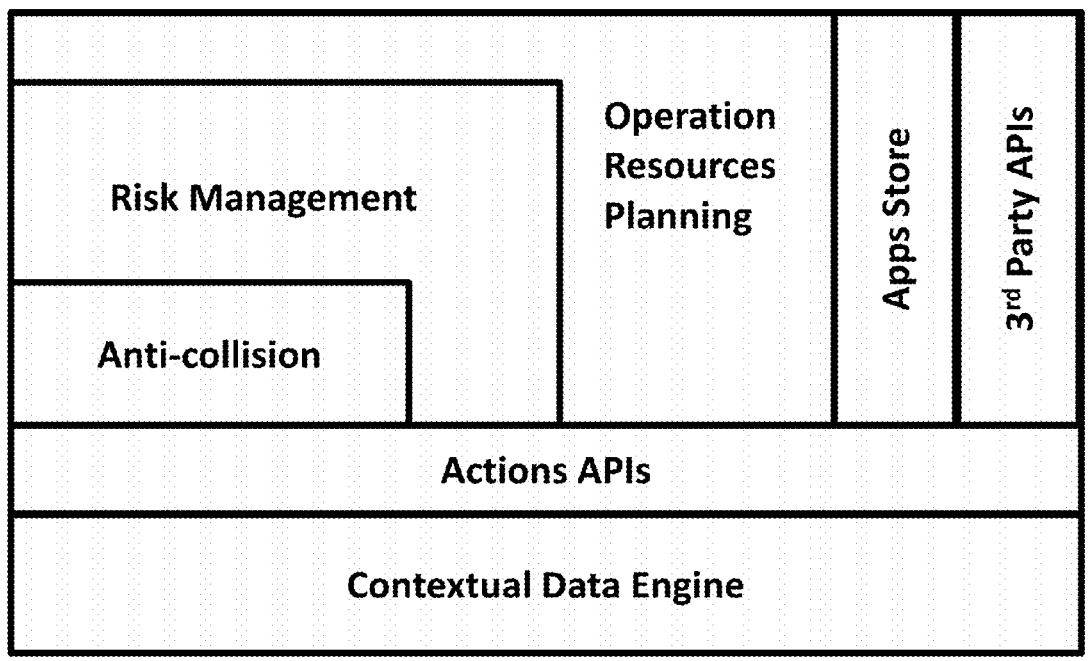
FIG. 11 shows a non-limiting example of an operation resource planning in conjunction with a contextual data engine.

FIG. 11 shows an example design of operation resource planning in conjunction with contextual data engine. The core of the platform is a contextual data engine, which was coupled with sensing devices via action API to acquire signals and data to infer actions and events happening on worksites. Based on the events and actions, the platform could predict anti-collision, manage risks, and perform operation resource planning. Furthermore, there was an app store allowing users to download applications on the sensing devices or mobile devices. The platform also comprised a $3^{rd}$ party API, which allowed third parties to create specific services on top of the platform.

Figure 12:
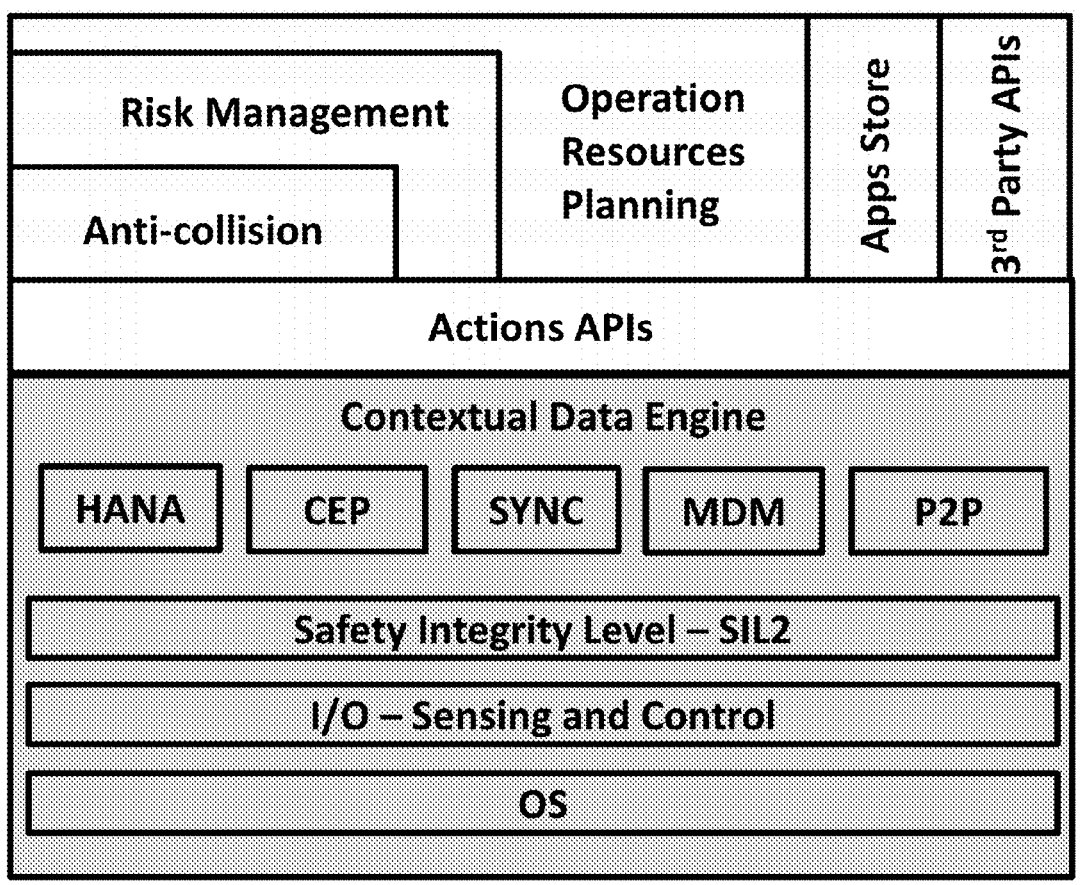
FIG. 12 shows a non-limiting example of the components of a contextual data engine.

FIG. 12 shows more detailed components of the contextual data engine. The core of the engine was an operation system. The contextual data engine comprised an input/output interface coupled to sensing devices to facilitate sensing and control. Moreover, a safety integrity level was built along with the core I/O and operation system. The engine further comprised a SAP HANA which converged database and application platform capabilities in-memory to transform transactions, analytics, text analysis, predictive and spatial processing so businesses can operate in real-time. The engine also included a complex even processing (CEP) module, which analyzed the signals from sensing devices and inferred what events were happening and derived a conclusion from the signals.

In this example, the contextual data engine comprises a synchronization (SYNC) module to synchronize all the events across the objects and sensing devices on the worksite, or even across the resource providers. In addition, the communication module comprised a mobile device management (MDM) module, which managed, scheduled, controlled and protected the signals/data and configuration settings for all mobile devices in the network. Last, the engine comprised a communication module based on P2P protocol for exchanging signals and data between sensing devices and any platform components.

What is claimed is:

1. A computing platform for automatic real-time worksite monitoring and real-time risk prevention, the platform comprising:
    (a) one or more sensing devices installed on one or more objects on a worksite, wherein each of the one or more sensing devices comprises:
        (i) one or more sensors;
        (ii) a signal acquisition module configured to read sensing signals from the one or more sensors;
        (iii) a memory module, an embedded processor, and an embedded operating system comprising an embedded multi-application platform;
        (iv) a data storage storing the sensing signals;
        (v) a communication module configured to transmit the sensing signals to a server and receive instruction signals from the server; and
        (vi) an embedded actionable data server and a command and control module configured to real-time control the one or more objects based on the sensing signals or the instruction signals; and
    (b) the server comprising a memory module, a server processor and a server operating system, wherein the server is configured to provide a server user with a server application and the server application comprises:
        (i) an in-memory contextual data engine configured to infer operational context of the one or more objects and of the worksite,
        (ii) an anti-collision module comprising an anti-balancing system and configured to prevent a collision by (1) integrating and analyzing at least motion signals, weather conditions, and equipment loads and torques, (2) predicting the collision, and (3) overriding a user command with a machine control in the embedded actionable data server and the command and control module;
        (iii) a risk management module configured to avoid a risk, and
        (iv) an operation resources planning module configured to: record skills of workers on the worksite; control access to the worksite, the one or more objects and the one or more sensing devices; recommend resource allocation; and monitor energy consumption; and
    (c) a mobile device comprising a memory module, a mobile processor, and a mobile operating system, wherein the mobile device is configured to provide a mobile user with a mobile application and the mobile application comprises:
        (i) a software module configured to display a real-time condition of the worksite, wherein the real-time condition comprises a scene of the worksite, a predicted movement of the one or more objects, and a predicted location of the one or more objects, and (ii) a software module configured to receive an alert from the server application and generate an alarm to the mobile user.

2. The platform of claim 1, wherein each of the sensing signals comprises information of an object on the worksite, the information comprising a location, a direction, a speed and one or more of: a rotation angle, a rotation speed, an acceleration, an angular acceleration, a lifting angle, a pressure, a temperature, a concentration, a force, a torque, a stability, and a balance.

3. The platform of claim 1, wherein the one or more sensors comprise one or more of the following: one or more position sensors, one or more RF tags, one or more GPS tracking units, one or more wind speed sensors, wind direction sensors, one or more temperature sensors, one or more rain sensors, one or more snow sensors, one or more liquid sensors, one or more gas sensors, one or more carbon dioxide sensors, one or more carbon monoxide sensors, one or more oxygen sensors, one or more motion sensors, one or more speed sensors, one or more acceleration sensors, one or more pressure sensors, one or more torque sensors, one or more force sensors, one or more load sensors, one or more electric current sensors, one or more electric voltage sensors, one or more stability sensor, and one or more balance sensors.

4. The platform of claim 1, wherein the in-memory contextual data engine is configured to perform: (a) analyzing the sensing signals to track locations of the one or more objects; (b) recording operation logs of the one or more objects; and (c) recording maintenance performed on the one or more objects.

5. The platform of claim 1, wherein the anti-collision module is configured to perform: (a) predicting a collision between two or more objects; (b) identifying and tracking the locations of workers on the worksite; and (c) monitoring a pedestrian collision.

6. The platform of claim 1, wherein the operation resources planning module is further configured to perform one or more of the following: (a) tracking materials or products in a logistic chain; (b) monitoring a status of a task; (c) evaluating a status or performance of a project; and (d) monitoring a usage of an asset.

7. The platform of claim 1, wherein the risk management module is configured to perform: (a) allowing the server user to set up one or more operation rules of the worksite; (b) producing an alert when one of the one or more operation rules is violated; (c) monitoring a health condition of workers on the worksite; and (d) contacting a health care provider when a risk occurs.

8. The platform of claim 7, wherein the one or more operation rules comprise a risk management rule, a rescue rule, and one or more of the following: a compliance with a law, a safety rule, a security rule, a health rule, a traffic rule, a transportation rule, a collision rule, and an object movement rule.

9. The platform of claim 1, wherein the server application further comprises an interface to allow the server user to navigate the worksite on a display of the server.

10. The platform of claim 1, wherein the real-time condition further comprises a map of the worksite, an operation zone of the one or more objects, a weather condition, a workforce condition, and a supply chain condition.

11. The platform of claim 1 further comprising a cloud storage comprising (a) a software module configured to synchronize the sensing signals across the one or more sensing devices, the server, and the mobile device; and (b) a software module configured to replicate the sensing signals in the cloud storage.

12. The platform of claim 1, wherein the one or more objects comprise one or more of: one or more vehicles, one or more cranes, one or more aircrafts, one or more cargo, one or more machines, one or more freights, one or more assets, one or more raw materials, one or more gates, one or more heavy equipments, one or more power plants, one or more buildings, and one or more tractors.

13. A computing system for automatic real-time worksite monitoring and real-time risk prevention comprising:
(a) one or more sensing devices installed on one or more objects on a worksite, wherein each of the one or more sensing devices comprises:
  (i) one or more sensors;
  (ii) a signal acquisition module configured to read sensing signals from the one or more sensors;
  (iii) a memory module, an embedded processor, and an embedded operating system comprising an embedded multi-application platform;
  (iv) a data storage storing the sensing signals;
  (v) a communication module configured to transmit the sensing signals to a server and receive instruction signals from the server; and
  (vi) an embedded actionable data server and a command and control module configured to real-time control the one or more objects based on the sensing signals or the instruction signals; and
(b) the server comprising a server memory module, a server processor and a server operating system, wherein the server is configured to provide a server user with a server application, and the server application comprises:
  (i) an in-memory contextual data engine configured to infer operational context of the one or more objects and of the worksite,
  (ii) an anti-collision module comprising an anti-balancing system and configured to prevent a collision by (1) integrating and analyzing at least motion signals, weather conditions, and equipment loads and torques, (2) predicting the collision, and (3) overriding a user command with a machine control in the embedded actionable data server and the command and control module,
  (iii) a risk management module configured to avoid a risk, and
  (iv) an operation resources planning module configured to record skills of workers on the worksite; control access to the worksite, the one or more objects and the one or more sensing devices; recommend resource allocation; and monitor energy consumption.

14. The system of claim 13, wherein the one or more sensing devices comprise one or more of the following: one or more position sensors, one or more RF tags, one or more GPS tracking units, one or more wind speed sensors, wind direction sensors, one or more temperature sensors, one or more rain sensors, one or more snow sensors, one or more liquid sensors, one or more gas sensors, one or more carbon dioxide sensors, one or more carbon monoxide sensors, one or more oxygen sensors, one or more motion sensors, one or more speed sensors, one or more acceleration sensors, one or more pressure sensors, one or more torque sensors, one or more force sensors, one or more load sensors, one or more electric current sensors, one or more electric voltage sensors, one or more stability sensor, and one or more balance sensors.

15. The system of claim 13, wherein the in-memory contextual data engine is configured to perform: (a) receiving sensing signals from the one or more sensing devices and analyzing the sensing signals to track locations of the one or more objects; (b) recording operation logs of the one or more objects; (c) recording maintenance performed on the one or more objects; (d) predicting a collision between two or more objects; and (e) identifying and tracking the locations of workers on the worksite.

16. The system of claim 13, wherein the anti-collision module is configured to perform: (a) predicting a collision between two or more objects; (b) identifying and tracking the locations of workers on the worksite; and (c) monitoring a pedestrian collision.

17. The system of claim 13, wherein the operation resources planning module is further configured to perform one or more of the following: (a) tracking materials or products in a logistic chain; (b) monitoring a status of a task; (c) evaluating a status or performance of a project; and (d) monitoring a usage of an asset.

18. The system of claim 13, wherein the risk management module is configured to perform: (a) allowing the server user to set up one or more operation rules of the worksite; (b) producing an alert when one of the one or more operation rules is violated; (c) monitoring a health condition of workers on the worksite; and (d) contacting a health care provider when a risk occurs.

19. The system of claim 18, wherein the one or more operation rules comprise a risk management rule, a rescue rule, and one or more of the following: a compliance with a law, a safety rule, a security rule, a health rule, a traffic rule, a transportation rule, a collision rule, an object movement rule.

20. The system of claim 13, wherein the server application further comprises an interface to allow a server user to navigate the worksite on a display of the server and monitor a real-time condition of the worksite, wherein the real-time condition comprises a map of the worksite, an operation zone of the one or more objects, and one or more of: a scene of the worksite, a predicted movement of the one or more objects, a predicted location of the one or more objects, a weather condition, a workforce condition, and a supply chain condition.

* * * * *